United States Patent [19]

Tracy et al.

[11] 4,399,570
[45] Aug. 23, 1983

[54] PORTABLE LIFT FOR HANDICAPPED PERSONS

[76] Inventors: Gary B. Tracy, 1804 Brigman St.; Geary M. Leggett, 6433 Clover Marie La., both of Anderson, Calif. 96007

[21] Appl. No.: 321,549

[22] Filed: Nov. 16, 1981

[51] Int. Cl.³ .............................................. A47K 3/00
[52] U.S. Cl. ...................................... 4/561; 187/1 R; 297/345; 297/346; 5/63; 5/81 R
[58] Field of Search .................. 4/561, 559, 564, 562, 4/496, 560; 5/63, 81 R, 83; 128/365, 369; 187/1 R, 9 R; 297/DIG. 4, DIG. 10, 344, 345, 346, 310, 307

[56] References Cited

U.S. PATENT DOCUMENTS

| | | | |
|---|---|---|---|
| 1,126,583 | 1/1915 | Sobra | 182/102 |
| 2,187,283 | 1/1940 | Scheutz | 4/561 X |
| 2,462,627 | 2/1949 | Garrett | 4/564 |
| 2,841,246 | 7/1958 | Lamb | 187/6 |
| 2,975,435 | 3/1961 | Forrest | 4/564 X |
| 3,317,928 | 5/1967 | Root | 4/561 |
| 3,885,685 | 5/1975 | Montgomery et al. | 187/9 R X |
| 4,091,478 | 5/1978 | Hardwick et al. | 4/562 |
| 4,183,106 | 1/1980 | Grimes et al. | 4/496 |
| 4,206,523 | 6/1980 | James | 4/562 |
| 4,281,744 | 8/1981 | Koerber | 187/9 R |
| 4,283,803 | 8/1981 | Krumbeck | 4/496 |

*Primary Examiner*—Henry K. Artis

[57] ABSTRACT

A portable lift is provided for use in aiding handicapped individuals in boarding or debarking from boats, airplanes and other vehicles, and in entering and exiting swimming pools and saunas, including multiple adapter systems designed to facilitate each of the above uses.

8 Claims, 11 Drawing Figures

PORTABLE LIFT FOR HANDICAPPED PERSONS

BACKGROUND OF THE INVENTION

1. Field of the Invention

This invention relates generally to the field of portable lifts, and more specifically to portable lifts designed to accommodate handicapped persons, and to adapt to a number of different circumstances.

2. Description of the Prior Art

In the past, inventors have addressed their efforts toward design and development of lifting mechanisms which would permit the loading of an occupied wheelchair into a van. Other inventions were designed specifically to provide lifting apparatus for conveying a wheelchair into an airplane or a ship. Other prior art relating to lifts includes elevators and cargo lifts. While efforts in the past were successful in providing lifts which were quite safe and, in some cases, portable, none of the prior art discovered by applicant was directed toward a lift for handicapped persons having the degree of adaptability which the present invention possesses. The present invention, because of its portable features, may be used to load a wheelchair into an airplane or to lift a handicapped person into or out of a sauna, into or out of a swimming pool, or into or out of a boat or an airplane. None of the prior art discovered has disclosed this degree of flexibility.

SUMMARY OF THE INVENTION

The present invention relates to an improved portable lift designed to facilitate the movement of physically handicapped individuals into or out of airplanes, buses, other vehicles, tubs, pools or saunas. The basic lift consists of a structural frame which includes a mount attached to the frame in such a way that it slides up and down on tracks which are attached to and form part of the frame. To insure safety, a motor and threaded rod/bearing combination is employed to accomplish the lifting or lowering of the mount. Receptacles are provided on the mount for mounting a seat, a sauna seat, or a wheelchair base. The seat used with the lift is designed so that it swivels, thereby giving a 360 degree field of movement when raised above the top edge of the structural frame. The structural frame is further designed to be held in place at the top by extensions from an adapter for use with a given vehicle, and has standoffs which hold it rigid once in place. The lift includes adapters which permit its use on the side of a boat, with a hot tub, with a swimming pool, and with an airplane.

DESCRIPTION OF THE PREFERRED EMBODIMENT

Figure 1:
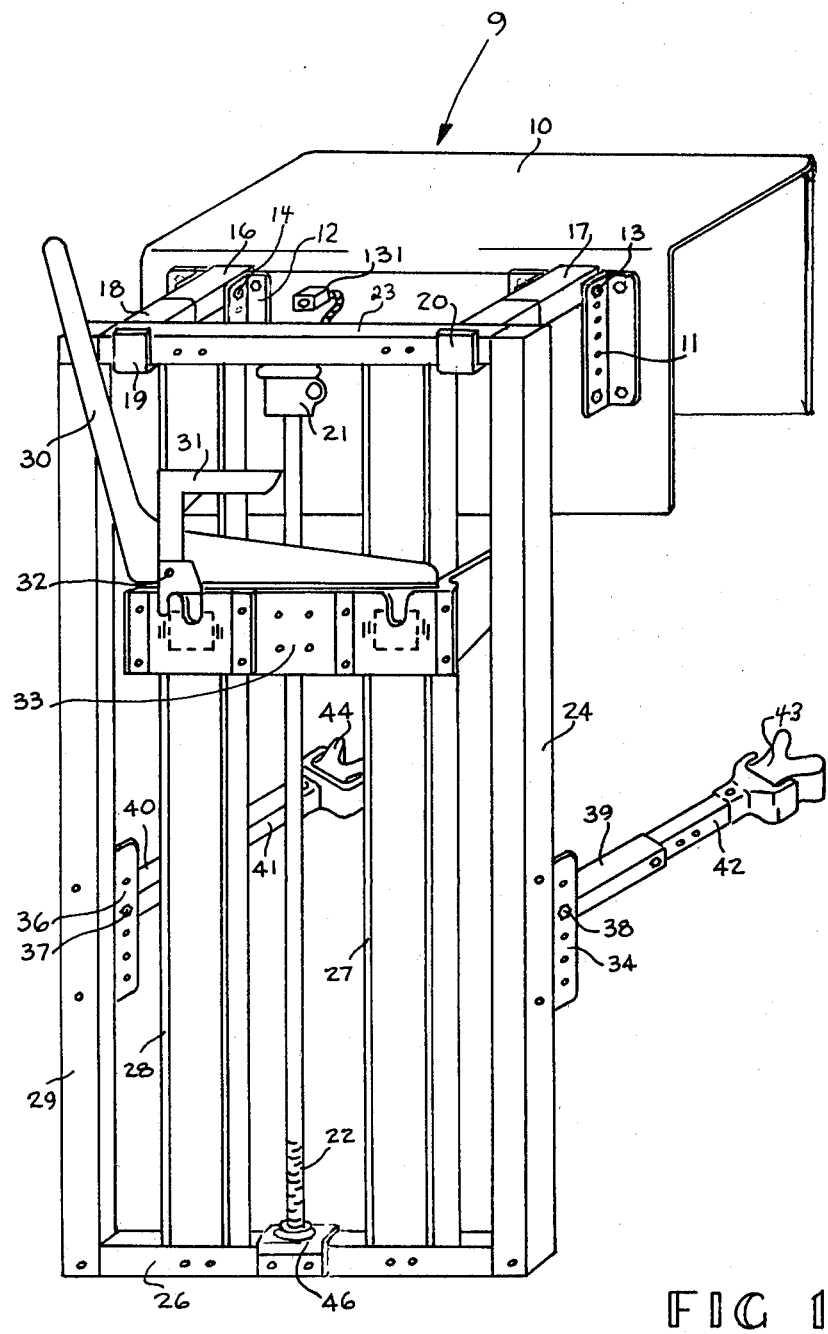
FIG. 1 shows a perspective view of the portable lift, mounted upon the adapter used with small boats.

Viewing FIG. 1, a portable handicap lift is designated generally as (9). The frame of the lift (9) consists of two vertical structural members, (24) and (29), joined together at the top by horizontal structural member (23), and at the bottom by horizontal structural member (26). The basic frame members, (24), (29), (26) and (23), are constructed of hollow aluminum rod, although solid aluminum rod, hollow steel rod, solid steel rod or some other appropriate material could as well be used. Hollow aluminum rod was chosen for use in these structural members because it is strong and lightweight. Two vertical slide support members (27) and (28) are provided, and are attached at the bottom to horizontal structural member (26), and at the top to horizontal structural member (23). These two vertical slide support members (27) and (28) are constructed of aluminum I-beam. Although other metals could be used effectively, aluminum was chosen because it is strong and lightweight. A steel threaded rod (22) is provided which is supported at the bottom by bearing (46), which is attached to horizontal structural member (26), and is supported at the top by motor transmission unit (21), which is attached to horizontal structural member (23). This threaded steel rod (22), in conjunction with threaded piece (137) more fully shown in FIG. 2, raises and lowers the seat structural and attachment system (33) when it is turned.

Standoff support bases (34) and (36) are provided, and are attached to vertical structural members (24) and (29) respectively. Standoff supports are provided consisting of hollow standoff support portion (39), which is constructed of hollow aluminum rod; solid standoff support portion (42), which is constructed of hollow or solid aluminum rod and which slides into hollow standoff support portion (39); bumper attachment (134); and standoff bumper (43), which is constructed of rubber or some other acceptable material. Hollow standoff support portion (39) is connected to standoff support base (34) through the use of pivot pin (38), thereby permitting the standoff support to swing upward or downward. A second standoff support is provided as partially shown (40), (41), (44) and (136). Both standoffs are constructed in the same way, so that they can swing upward or downward on pivot pins (37) and (38). FIG. 1 further shows the adapter plate (10), which is designed to permit the use of the lift system with a boat. This adapter plate (10) consists of a thick aluminum plate which is bent in the shape of a U. Attached to aluminum adapter plate (10) are hanging bar supports (11) and (12), which are constructed of aluminum or other appropriate metal. Hanging bars (16) and (17) are attached to hanging bar supports (11) and (12) through the use of bolts (13) and (14), which permit hanging bars (16) and (17) to swing upward. Additionally, a swivel bar (18) is attached to hanging bar (16), and permits the lift to swivel thereon. The swivel arrangement and movement of hanging bar (16) and swivel bar (18) is shown in greater detail in FIG. 5. Horizontal structural member (23) slips into hanging bar clamps (19) and (20), which are attached to swivel portion (18) and hanging bar (17) as shown.

Figure 2:
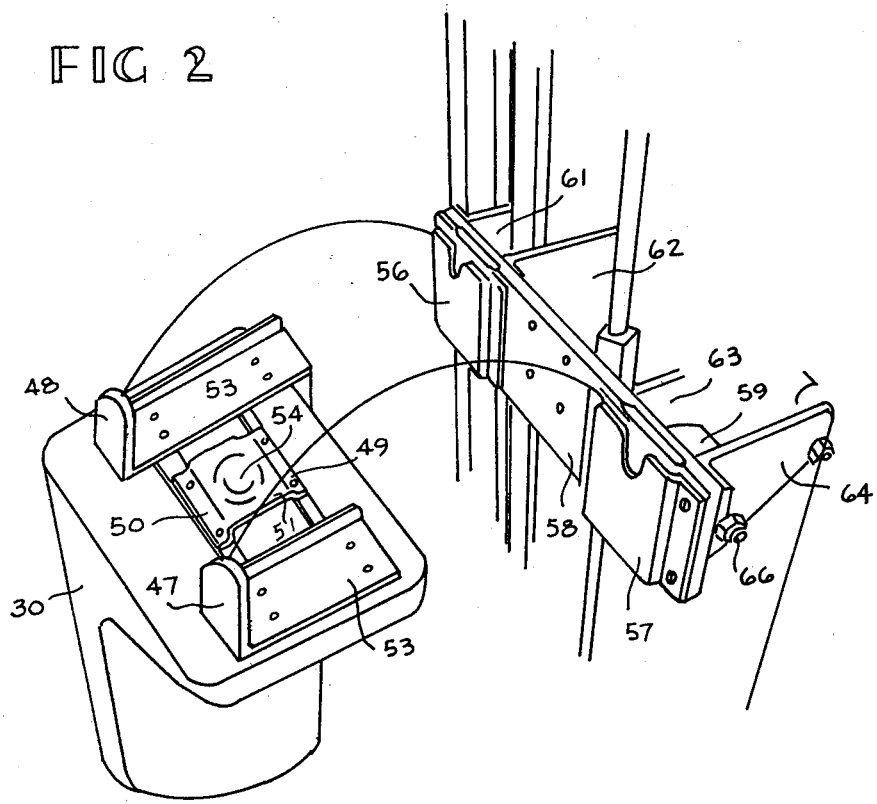
FIG. 2 shows a close-up perspective view of the receptable arrangement for use in attaching the chair to the lift, and shows the roller configuration in more detail.

Now going to FIG. 2 of the drawings, a close-up perspective view of the seat structural and attachment system (33) is shown, along with the construction of the seat. Tongue receptacles (56) and (57), which are constructed of aluminum, are attached to load support member (58), which is also constructed of aluminum. Threaded steel rod (22) is threaded through threaded piece (137), which is attached to load support member (58), thereby permitting the load support member (58) to be raised or lowered when threaded steel rod (22) is turned. Support tongues (47) and (48) fit into tongue receptacles (56) and (57). The seat support is constructed of seat structural support members (52) and (53), which are attached to seat support tongues (47) and (48), and of seat structural support members (49), (50) and (51), all of which are constructed of aluminum, but which could also be constructed of other appropriate metal. The seat (30) swivels with respect to seat structural support member (51) on pin (54).

FIG. 2 further shows roller support members (61), (62), (63) and (64) in greater detail. A more detailed view of the placement of the rollers with respect to these roller support members (61), (62), (63) and (64) is shown in FIGS. 4 and 4A.

Figure 4:
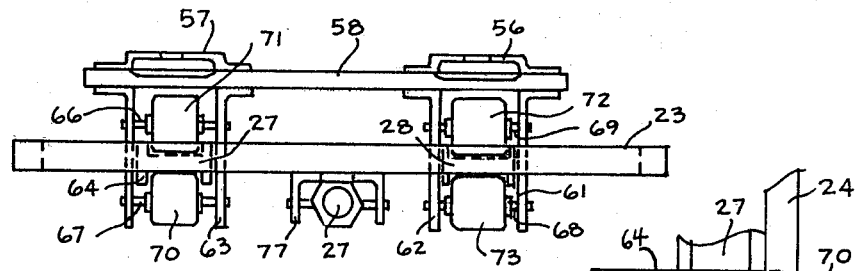
FIG. 4 is a top view showing the roller configuration in more detail.

Now going to FIG. 4, a vertical cutaway view is given showing the placement of the rollers and other parts with respect to horizontal structural member (23). Rollers (70), (71), (72) and (73), which are constructed of nylon, plastic or other appropriate material, roll and are provided to facilitate smoother sliding of the lift unit along vertical slide support members (27) and (28). These rollers are held in position by and turn on pins (66), (67), (68) and (69), which are connected to roller support members (61), (62), (63) and (64). Roller support members (61), (62), (63) and (64) are constructed of aluminum, but could as well be made of other appropriate metal or other appropriate material. Roller support members (61), (62), (63) and (64) are connected to and held in place by load support member (58). FIG. 4 further shows the connection of tongue receptacles (56) and (57) to load support member (58) in much greater detail.

Figure 4A:
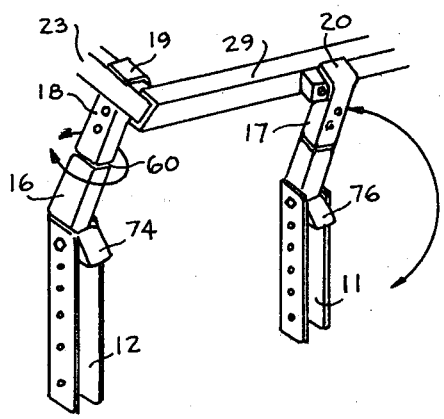
FIG. 4A is a side view taken along lines 4—4 which more clearly shows the roller configuration.

FIG. 4A is a detailed side view showing the relative position of rollers (70) and (71) with respect to roller support member (64), and further with respect to vertical slide member (27). It should be noted that roller (70) rolls in the channel of slide support member (64), opposite the loaded area. It should further be noted that roller (70) is placed in a position higher than that of roller (71), thereby providing support when the lift unit is heavily loaded.

Figure 3:
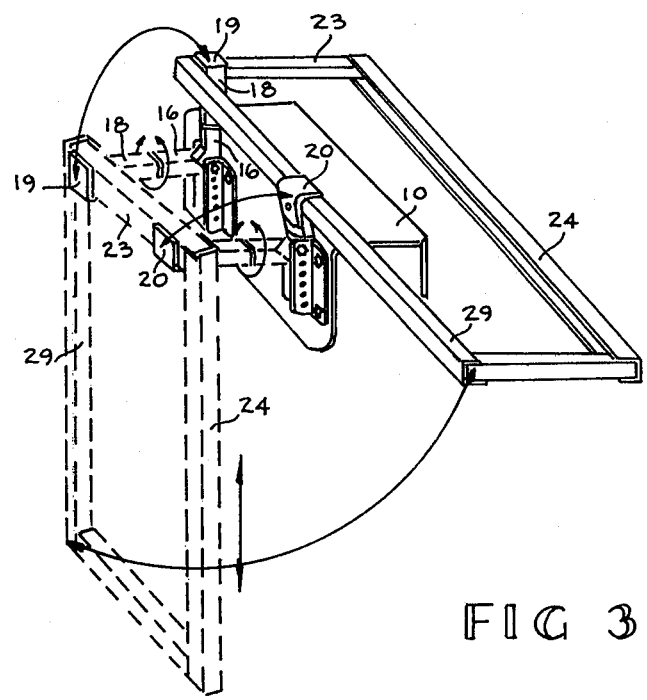
FIG. 3 shows the movements involved in folding the lift up and over the edge of a boat.
Figure 5:
FIG. 5 is a close-up perspective view showing in more detail the movements involved in the folding process shown in FIG. 3.

Now going to FIGS. 3 and 5, the specific movements involved in folding the lift over the edge of a boat for storage are shown. It will be noted that swivel bar (18) swivels on pin (60) with respect to hanging bar (16) and that, as the lift frame is swung upward, horizontal structural member (23) continues to be held in place by hanging bar clamp (19), but that horizontal structural member (23) slips out of hanging bar clamp (20). The lift frame is then swung upward, and vertical structural member (29) is slipped into hanging bar clamp (20). This being done, the lift frame may be swung up and over into a horizontal position by swinging hanging bars (16) and (17) upward. FIG. 5 further shows hanging bar stops (74) and (76), which are constructed of aluminum and which support hanging bars (16) and (17) in a horizontal position when the lift frame is mounted thereon.

Figure 6:
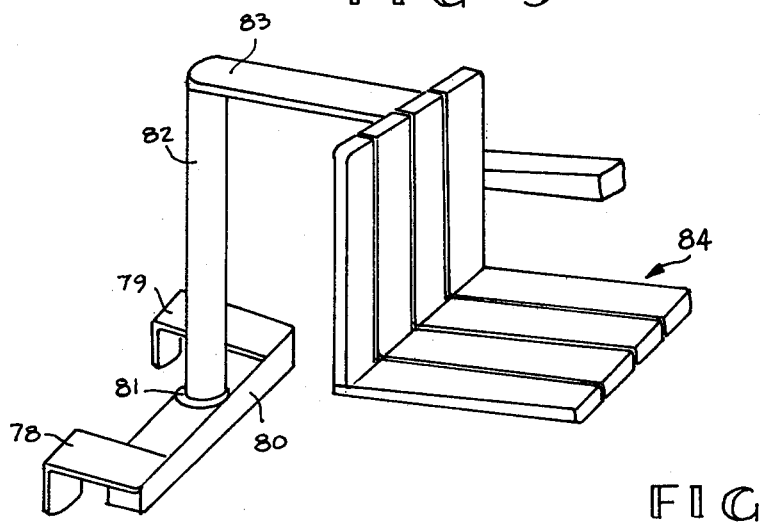
FIG. 6 shows a sauna chair adapted to be used with the lift of FIG. 1.

Now going to FIG. 6, a sauna chair adapted for use with the portable lift is shown. Support tongues (79) and (78) are constructed of aluminum or some other appropriate material and, in operation, are fitted into tongue receptacles (56) and (57), shown in FIG. 2. Support tongues (78) and (79) are further attached to support base (80), which is in turn attached to vertical member (82) through the use of bearing (81), thereby permitting vertical member (82) to swivel with respect to support base (80). Horizontal member (83) is attached to vertical member (82), and further attached to sauna chair (84).

Figure 7:
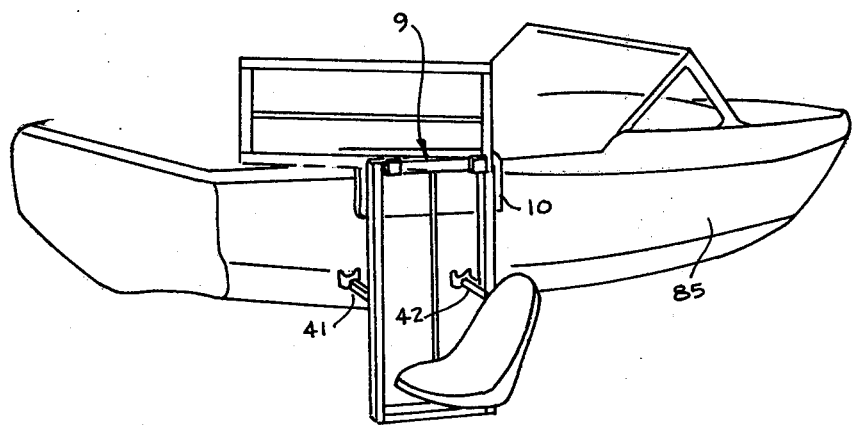
FIG. 7 shows the lift in position on the side of a boat.

Now continuing on to FIG. 7, the portable lift unit is shown in place on the side of a boat. As will be noted, adapter plate (10) fits over the side of the boat, and the portable lift unit is attached thereto. It will further be noted that inner standoff bumpers (43) and (44) fit snugly against the boat, thereby maintaining stability while in use.

Figure 8:
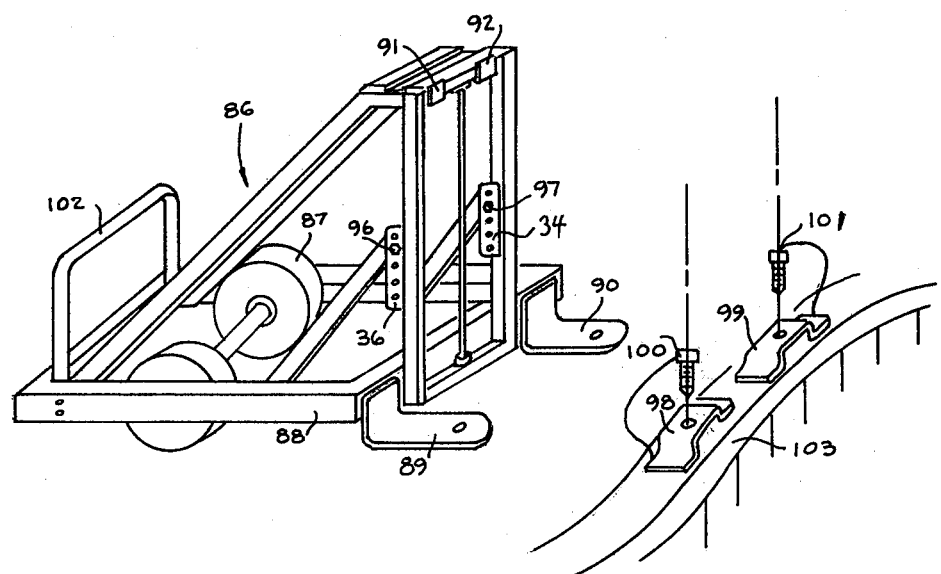
FIG. 8 shows the adapter unit which permits the lift to be used at poolside.

FIG. 8 shows a poolside adapter (86) for use with the portable lift (9). This poolside adapter consists generally of wheels (87) with a structural base (88) made of steel or some other appropriate metal, and with a handle (102) attached thereto for purposes of moving the unit. Tongues (89) and (90), which are attached to the structural base (88), are adapted to fit into tongue receptacles (98) and (99), mounted at the edge of a pool, and are held in place through the use of bolts (100) and (101). The portable lift unit is held in place with respect to the poolside adapter by being hung upon hanging clamps (91) and (92), and is given further stability by attachment of poolside unit (86) to standoff support bases (34) and (36) through the use of bolts (96) and (97).

Figure 9:
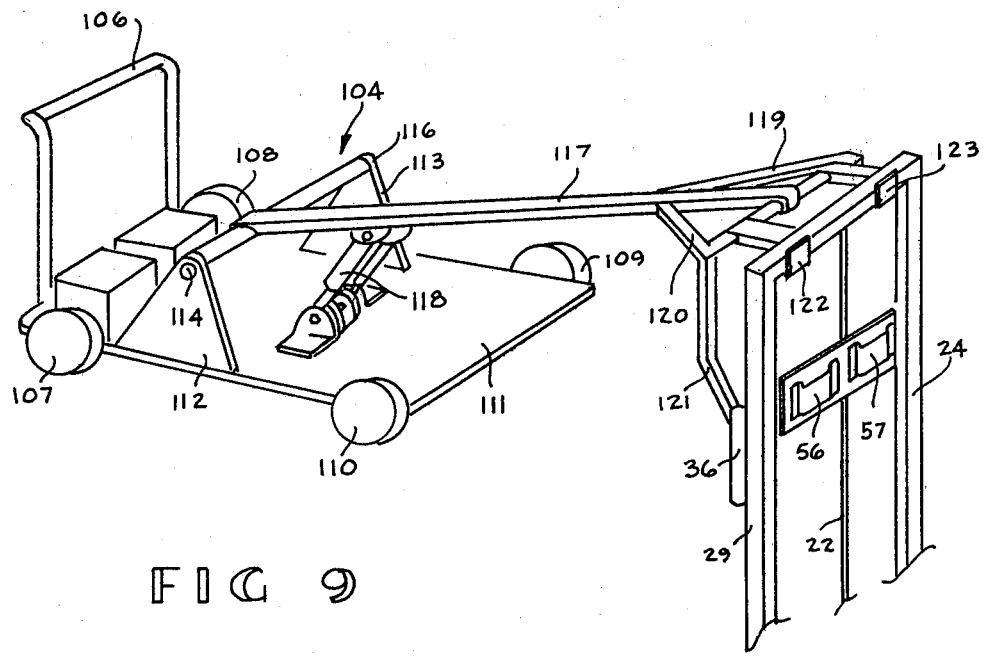
FIG. 9 shows the lift of FIG. 1 in place upon a transport unit for use with airplanes.

Now going to FIG. 9, an airport transport unit (104) for use with the portable lift unit in loading disabled passengers on airplanes is shown. The airport transport unit (104) consists of a structural base (111) with four wheels (107), (108), (109) and (110) attached thereto, thereby facilitating movement, and further with a handle (106) attached at one end. Further, structural supports (112) and (113) are attached to the structural base (111) and to structural piece (138) at pivot points (114) and (116). A boom (117) is attached to the structural piece (138) at one end and, at the other end, to a boom structural support system consisting of bars (119), (120), (139), (140), (141), (121) and (142). The portable lift unit is held in place with respect to the airport transport unit (104) by hanging bar clamps (122) and (123), and by connecting bar (121) to standoff support base (36) with an appropriate connection on the opposite side which is not shown in this figure.

Figure 10:
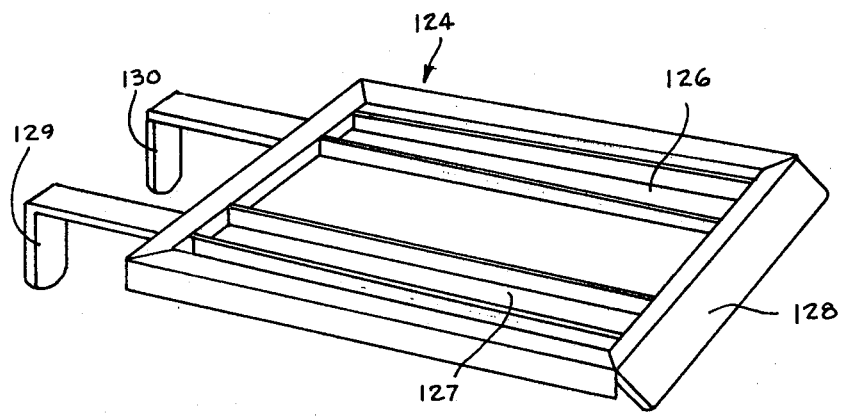
FIG. 10 shows a wheelchair base adapted to be used with the lift of FIG. 1.

Now going to FIG. 10, a support base for a wheelchair is shown consisting of ramp (128), metal support structure (124), wheel supports (126) and (127) and wheelchair platform support tongues (129) and (130). All of the parts of the wheelchair platform are constructed of aluminum or some other appropriate metal. In actual operation, support tongues (129) and (130) are inserted into tongue receptacles (56) and (57), as shown in FIG. 9 and previously discussed.

In operation, the basic portable handicap lift can be used to assist physically handicapped individuals to enter or exit boats, pools, airplanes and saunas. In the configuration for use with a boat, because of the light weight of the unit, a handicapped person, having lifted himself to a point from which he can enter the boat, can fold the unit upward and over onto the side of the boat. Furthermore, when boating, the handicapped individual has the flexibility of being able to lower himself into the water, go swimming, and raise himself back into the boat without depending on the help of any other person. As a result, handicapped persons can engage in water sports which were heretofore impossible for them to enjoy without the help of another person. Because of the unique design of the lift and the hanging bar clamp arrangement, along with the standoff support and standoff support base arrangement, a single lift can for the first time be used by handicapped persons to enable them to engage in boating, swimming, sauna bathing and the use of airplanes without having to purchase individual units for each of those uses.

The foregoing description of the preferred embodiment is for illustrative purposes only and, because persons skilled in the art will readily see modifications and further adaptations of this system, it is applicant's intention not to be limited by the scope or breadth of the discussion of the preferred embodiment, but to be limited only by the scope of the claims which follow.

I claim:

1. A portable lift for use in aiding individuals in boarding or debarking from vehicles, or in entering and exiting pools, saunas or the like, comprising:
   a structural frame constructed of two or more vertical structural members, each attached at the top to an upper horizontal structural member and at the bottom to a lower horizontal structural member;
   two or more vertical slide support members, each attached at the top to said upper horizontal structural member and at the bottom to said lower horizontal structural member;
   a bearing attached to said lower horizontal structural member;
   a motor transmission unit attached to said upper horizontal structural member;
   a threaded metal rod supported by said bearing and attached to to said motor transmission unit;
   a load support system having a threaded hole through which said threaded metal rod is screwed, whereby said load support system may be raised or lowered when said threaded metal rod is turned, and further having receptacles;
   sliding means rigidly attached to said load support plate and slideably attached to said vertical slide support members.

2. The invention of claim 1, wherein said sliding means consists of two or more rollers which roll against said vertical slide support members.

3. The invention of claim 1 or 2, including a seat unit consisting of:
   a metal seat base having two or more metal tongues whereby said metal seat base will mount to said receptacles on said load support system;
   first swivel means attached to said metal seat base;
   a seat attached to said first swivel means on said metal seat base.

4. The invention of claim 1 or 2, including:
   one or more standoffs, consisting of a standoff support rod pivotally connected at one end to said vertical structural member and having a standoff bumper constructed of a cushioning material which is connected to the other end;
   an adapter for use in attaching said portable lift to the side of a boat, consisting of:
   a metal boat clamp with a channel of sufficient width to slip over the gunwale of a boat;
   two or more hanging bars, each pivotally attached at one end to said metal boat clamp and having a lift attachment clamp at the opposite end whereby said portable lift may be attached to said hanging bars.

5. The invention of claim 4, wherein one of said hanging bars includes second swivel means whereby said portable lift will swing upward for storage.

6. The invention of claim 1 or 2, including a sauna seat consisting of:
   a metal base having two or more metal tongues whereby said metal base will mount to said receptacles on said load support system;
   a vertical structural piece attached at the bottom to said metal base and having a horizontal extension at the top;
   a seat attached to the end of said horizontal extension of said vertical structural piece.

7. The invention of claim 1 or 2, including a poolside adapter unit consisting of:
   a horizontal structural base having one or more metal tongues extending therefrom;
   an axle attached to said structural base and having wheels thereon;
   an upright structural member having hanging bar clamps thereon whereby said portable lift may be rigidly attached to said poolside adapter unit;
   one or more receptacles securely anchored, whereby said metal tongues may be secured at poolside.

8. The invention of claim 1 or 2, including:
   an airport transport unit having hanging bar clamps and supports whereby said portable lift may be rigidly attached thereto;
   a wheelchair base having one or more metal tongues extending therefrom whereby said wheelchair base will mount to said receptacles on said load support system.

* * * * *